United States Patent [19]

Yi

[11] 4,357,449

[45] Nov. 2, 1982

[54] DISPERSION POLYMERIZATION OF CYCLOOLEFINS

[75] Inventor: Kong S. Yi, Parma, Ohio

[73] Assignee: The B. F. Goodrich Company, Akron, Ohio

[21] Appl. No.: 321,661

[22] Filed: Nov. 16, 1981

[51] Int. Cl.$^3$ .............................................. C08F 2/08
[52] U.S. Cl. ................................... 526/74; 525/211; 525/247; 526/169; 526/201; 526/283
[58] Field of Search ....................... 526/74, 169, 201; 525/247

[56] References Cited

U.S. PATENT DOCUMENTS 4,039,491  8/1977  Ikeda et al. ..................... 525/247
4,138,448  2/1979  Minchak .......................... 526/169

*Primary Examiner*—Stanford M. Levin

*Attorney, Agent, or Firm*—George A. Kap

[57] ABSTRACT

At least one cycloolefin monomer containing the norbornene group is polymerized by ring opening polymerization in a hydrocarbon diluent selected from $C_4$ to $C_6$ alkanes and isooctane that is a solvent for the monomer(s) but a nonsolvent for the resulting polymer, in the presence of a dispersant selected from terpolymers of ethylene, propylene, and dicyclopentadiene, copolymers of styrene and butadiene, and homopolymers of butadiene, whereby a dispersion of polymer particles in the diluent is produced having a particle size that is substantially smaller than polymer particles prepared in absence of the dispersant, which polymer particles, in the preferred embodiment, do not settle out almost immediately after stopping agitation and result in a much cleaner reactor than in slurry polymerization systems where dispersants are not used.

10 Claims, No Drawings

DISPERSION POLYMERIZATION OF CYCLOOLEFINS

BACKGROUND OF THE INVENTION

When polymers are prepared by normal slurry polymerization technique, the system consists of two phases: the diluent phase and the solid polymer particle phase. The diluent phase may consist of monomers only or monomers dissolved in a hydrocarbon medium. The diluent, therefore, is a solvent for the monomers and catalysts but a nonsolvent for the polymer formed.

In slurry polymerization, the particles are generally not stabilized and tend to agglomerate to form a polymer paste or slurry that comprises a mass of sticky polymer particles that are swollen by the monomer. A common problem created by this type of product is the adherence of the polymer particles to the reactor walls and the agitation equipment in the reactor as well as the plugging of transfer lines, valves, and pumps. Needless to say, this causes severe maintenance problems. Since control of reaction temperature is of a major concern in a polymerization process, the swollen mass of polymer particles can also create additional heat transfer problems since a build-up thereof on reactor walls would lower the overall heat transfer coefficient for the reaction system.

It is, therefore, desirable to conduct two-phase slurry polymerization whereby polymer build-up on reactor walls and agitation equipment within the reactor is reduced to lessen maintenance problems and reactor clean-up. It is also desirable to conduct slurry polymerization in a manner whereby a dispersion is produced of fine polymer particles suspended in the diluent whereby, in a preferred embodiment, the dispersion is stable, i.e., where the polymer particles do not settle out immediately following the cessation of agitation. It is also desirable to produce a dispersion product prepared in the presence of a dispersant wherein the polymer particles are much smaller than in a dispersion product prepared in absence of a dispersant. The term "dispersion" polymerization will be used hereinafter to denote polymerization reactions wherein a dispersant is used to attain a dispersion of slurry polymer particles.

SUMMARY OF THE INVENTION

Dispersion polymerization of at least one cycloolefin is conducted in the presence of a hydrocarbon diluent selected from alkanes of 4 to 6 carbon atoms and isooctane, an unsaturated elastomer that functions as a dispersant and particle size controlling agent, a molecular weight modifier, and a catalyst, whereby a dispersion of fine polymer particles is formed that are subsequently separated and dried.

DETAILED DESCRIPTION OF THE INVENTION

By the implementation of the present invention, it is desired to overcome or reduce the problems of equipment maintenance due to plugging of pipes, valves, and pumps by agglomerating polymer particles, as well as to reduce polymer build-up on inner reactor walls which substantially lowers the overall heat transfer coefficient of the reaction system and thus renders more difficult the control of the polymerization reaction temperature. As is well known, controlling of the polymerization reaction is a prerequisite to forming polymers of uniform quaility with minimum particle agglomeration and polymer build-up on reactor walls in heterogeneous polymerization systems. It is also desired to reduce the average particle size of the polymer particles in the dispersion by the utilization of a dispersant in the dispersion polymerization of cycloolefins, as is described hereinafter.

The objects of this invention are realized by conducting the dispersion polymerization reaction of at least one cycloolefin in a diluent in the presence of an unsaturated elastomer that is soluble in the diluent. The monomer and the catalysts are also soluble in the diluent whereas the polymer particles that precipitate out are insoluble in the diluent. This polymerization reaction produces fine polymer particles dispersed in a diluent that, in a preferred embodiment, do not quickly settle out upon removal of agitation and leave interior reactor walls clean.

The cycloolefins that can be polymerized in accordance with the process described herein are norbornene-type monomers characterized by the presence of the norbornene group, defined structurally by the following formula I:

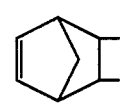

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulae II and III:

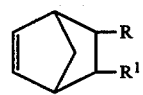 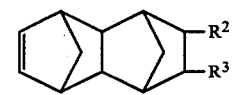

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms. In a preferred embodiment, R and $R^1$ are independently selected from hydrogen, alkyl groups of 1 to 3 carbon atoms, and monounsaturated hydrocarbon cyclic groups containing 5 carbon atoms, the cyclic group being formed by R and $R^1$ as well as by the two carbon atoms connected to R and $R^1$. In reference to formula III, $R^2$ and $R^3$ are independently selected from hydrogen and alkyl groups containing 1 to 20 carbon atoms, preferably 1 to 3 carbon atoms. Examples of monomers referred to herein include dicyclopentadiene, methyltetracyclododecane, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-no 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers, and terpolymers of methylnorbornene, methyltetracyclododecene and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene with remainder being polymerized dicyclopentadiene. The norbornene-type monomers, or a mixture thereof, can contain up to about 20% by weight of at least one other copolymerizable monomer.

The preferred catalyst employed in the dispersion of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The tungsten or molybdenum compound catalyst, or a mixture thereof, is employed at a level of about 0.01 to 50 millimoles per mol of monomer charge, preferably 0.1 to 10 millimoles. The molar ratio of the cocatalyst to the catalyst is not critical and can be in the range of about 200:1 or more, to 1:10, preferably from 10:1 to 2:1.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The alkylaluminum halide cocatalysts are selected from monoalkylaluminum dihalides $RAlX_2$, dialkylaluminum monohalides $R_2AlX$, aluminum sesquihalides $R_3Al_2X_3$, trialkylaluminum $R_3Al$, aluminum trihalide $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkylaluminum halides include ethylaluminum dichloride, diethylaluminum monochloride, ethaylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Although aluminum is the preferred reducing agent in the alkylaluminum halide cocatalysts, other organometallic halide reducing agents can function as well. Metals that form suitable organometallic cocatalysts include lithium, magnenium, boron, lead, zinc, tin, silicon and germanium. Also, the metallic hydrides can be substituted in whole or in part for the organometallic cocatalysts.

The diluent used in the dispersion polymerization reaction is a solvent for the monomers and catalysts that are employed, however, it is a nonsolvent for the polymer. Generally, one-half to two liters of diluent is used per 100 grams of monomer charge with about 0.1 to 10% of the diluent being used to predissolve the catalysts. The diluents are selected from alkanes containing 4 to 6 carbon atoms per molecule, and isooctane. Preferred diluents are pentane, hexane, and isooctane. To facilitate solubilization of catalysts in the diluent, a small amount of toluene, up to about 5% by volume of diluent, can be admixed with the diluent.

In a preferred embodiment, the molybdenum or tungsten compound catalyst is dissolved in a solvent prior to incorporation into the polymerization mixture. In the absence of a solvent for the molybdenum of tungsten compound catalyst, the polymerization proceeds with some difficulty due to the presence of insoluble salt, the catalyst portions of salt. A preferred solvent for the molybdenum or tungsten compound catalyst comprises at least one alkyl ester of a saturated carboxylic or dicarboxylic acid. Use of an ester solvent at lower temperatures has been found to produce a brief induction period of about 1 to about 5 minutes after addition of the molybdenum or tungsten compound catalyst to the monomer mixture. Such an induction period allows mixing of all components of the reaction mixture before substantial polymerization begins. The result is more uniform process control and, ultimately, substantially gel-free polymers that are more readily recovered from the reaction vessel and are more easily processable than gelled polymers.

Suitable alkyl esters of saturated carboxylic or dicarboxylic acids typically contain from 2 to 20, preferably 2 to 10 carbon atoms and may be substituted by 0 to 3, preferably 0 to 1, halogen atoms. The ester solvent should be liquid under a given set of reaction conditions in order to maintain the molybdenum or tungsten compound catalyst in solution during the reaction. The concentration of the molybdenum or tungsten compound catalyst in the ester solvent typically is from about 0.1 molar to about 1 molar. Examples of suitable alkyl esters include methyl formate, ethyl formate, methyl chloroformate, butyl chloroformate, methyl acetate, ethyl acetate, isopropyl acetate, t-butyl acetate, n-amyl acetate, methyl bromoacetate, ethyl chloroacetate, ethyl propionate, ethyl 2-bromopropionate, methyl 2-chloropropionate, ethyl butyrate, ethyl 2-bromobutyrate, ethyl isovalerate, methyl 5-bromovalerate, ethyl laurate, diethyl oxalate, dimethyl malonate, diethyl dimethylmalonate, diethyl chloromalonate, diethyl succinate, diethyl glutarate, diethyl suberate, adipic acid monomethyl ester, and the like.

A polymerization activator can be used but is generally not needed. Excellent activation is obtained using a peroxide or a hydroperoxide, especially the organic peroxides such as benzoyl peroxide. The activator can be employed in the range of up to 3 moles, preferably up to 1 mole, per mole of the alkylaluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Inert substituents on the remaining carbon atoms can be hydrogens and/or alkyl groups containing 1 to 8 carbon atoms. Examples of suitable acyclic olefins include 1-olefins, 2-olefins, 3-olefins, nonconjugated diolefins, and nonconjugated triolefins. More preferably, the nonconjugated acyclic olefins are selected from the group consisting of 1-olefins and 2-olefins containing 3 to 8 carbon atoms such as 1-butene, 1-pentene, 1-hexene, 3-methyl-1-butene, 2-pentene, 4- methyl-2-pentene, and the like. Compounds not having hydrogen atoms on double-bonded carbons are unreactive in this invention. Even conjugated olefins such as butadiene, isoprene and the like are active modifiers.

The nonconjugated acyclic olefin can be used at a level of about 0.0001 to 1, preferably 0.01 to 0.1 mole per mole of the monomer charge. The nonconjugated acyclic olefin can be charged directly or in solution at any point in the charging procedure, but it is preferably charged along with the monomers. When charged last, the nonconjugated acyclic olefin is preferably charged before the reaction begins.

The dispersant or elastomer that is added to the dispersion polymerization system is soluble in the hydrocarbon diluent and is selected from unsaturated elastomers that have a double bond along the backbone chain or in any pendant group. It is hypothesized that one segment of the elastomer is anchored in the interior of the polymer particle and another segment of the elastomer is coupled to the diluent phase, thus providing a steric barrier that stabilizes the dispersion. In general, the effect of steric barrier in a dispersion system is to lower the interfacial tension, reducing the energy required for phase separation and in turn, reducing the threshold molecular weight for particulation. It has been observed that when polymerization is conducted in the presence of a dispersant, the polymer particles are much smaller than the ordinary slurry products and they usually remain dispersed after agitation is stopped.

More specifically, suitable dispersants are selected from polymers of a lower aliphatic olefin of 2 to 10, preferably of 2 to 4 carbon atoms and a small amount of a cyclic diene monomer that contains a norbornene group and unsaturation outside of said norbornene group and unsaturation in the polymerized state; polymers of a vinyl aromatic compound containing 8 to 12, preferably 8 to 10 carbon atoms, and an aliphatic diene containing 4 to 12, preferably 4 to 6 carbon atoms; and polymers of at least one monomer selected from aliphatic dienes containing 4 to 12, preferably 4 to 6 carbon atoms.

Examples of suitable lower aliphatic olefins include ethylene and propylene, and examples of suitable cyclic dienes are dicyclopentadiene and ethylidene norbornene, that contain the norbornene group. The cyclic dienes that are useful herein contain unsaturation outside of the norbornene group, as in the double bond in ethylidene norbornene or as in cyclopentene attached to the norbornene group in dicyclopentadiene. An example of such a dispersant is a polymer of ethylene, propylene and dicyclopentadiene containing a major proportion of ethylene and propylene and a small proportion of dicyclopentadiene. Ethylene content of such elastomeric polymers should be at least about 40 mole percent, preferably at least about 50 mole percent, a minor amount of about 5 to 50, preferably 10 to 40 mole percent of propylene, and a small amount of diene. Amount of the cyclic diene is on the order of less than about 10 mole percent but preferably at least about 1 mole percent, and usually on the order of about 5 mole percent. Minor amounts of other copolymerizable monomers can be used as long as they do not adversely affect the dispersing properties of the elastomeric polymers. The ethylene/propylene/dicyclopentadiene elastomer having respective composition of 61/33.5/5.5 on weight basis, was found to perform admirably in terms of providing dispersing function as well as improving impact strength of the resulting polymer to an unexpected degree and reducing polymer particle size.

Another class of suitable dispersants is based on polymeric alipatic dienes, containing 4 to 12, preferably 4 to 6 carbon atoms per molecule. This class of dispersants includes conjugated and non-conjugated, preferably conjugated dienes, or a mixture thereof, defined as follows:

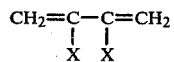

where each X is individually selected from hydrogen, halogens, alkyl radicals of 1 to 5 carbon atoms, and aryl radicals. In a preferred embodiment, each X is individually selected from hydrogen, chlorine, and alkyl radicals of 1 to 3 carbon atoms. Particularly preferred dienes are butadiene, chloroprene, isoprene, and mixtures thereof, especially the nonconjugated dienes such as 1,3-butadiene and 1,4-hexadiene. These dienes can be copolymerized with up to about 50% by weight of other polymerizable monomers such as vinyl aromatic compounds, specifically, styrene and alpha-methyl styrene. Specific examples of this class of dispersants include polystyrene-polybutadiene diblock copolymer with a composition of 25/75% by weight respectively, 48/52% by weight diblock copolymer of polystyrene/polybutadiene, 23/77% by weight random block copolymer of polystyrene/polybutadiene, and cis-polybutadiene homopolymer.

Amount of the dispersant added to the dispersion polymerization system should be sufficient to form a dispersion containing smaller polymer particles than without the dispersant, and in a preferred embodiment, the polymer particles dispersed in the diluent do not immediately settle out after stopping agitation. It should be understood that as long as the polymer particles remain in the dispersion or can be easily re-dispersed, the plugging of pipes, valves and pumping equipment can be reduced substantially due to the enhanced facility to move the polymer particles through conduits without settling where some agitation is always present and its magnitude is sufficient to maintain the particles in suspension. More specifically, amount of the dispersant should be at least 1 part, preferably 1 to 20 parts, and more preferably 2 to 10 parts per 100 parts of monomer charge.

To achieve the desired results, dispersion polymerization process described herein should be carried out pursuant to a defined procedure. The first step of the process comprises the addition of a diluent and a molecular weight modifier to a reactor equipped with an agitator. Normal pentane is the preferred diluent and 1-pentene is the preferred molecular weight modifier. Generally, one-half to two liters of a diluent is used per 100 grams of the monomer charge, although a small portion is used to pre-blend certain ingredients. Up to one mole of the modifier can be used per mole of the monomer charge. Next step is to dissolve the dispersant in n-pentane and add the solution to the reactor. A small amount of toluene is added to the diluent to facilitate solubility of the dispersant in the diluent, amount of toluene being about 100 to 300 ml per 10 liters of diluent. This step is followed by addition to the reactor of the monomer charge dissolved in the diluent and then the catalyst and cocatalyst also dissolved in a diluent or another solvent. In a preferred embodiment, the catalyst is predissolvent in an alkyl ester of a saturated carboxylic acid, such as ethyl acetate, to a concentration of 1 to 10% solids and the cocatalyst is predissolved in a diluent to about 20 to 30% solids. Upon addition of the catalysts, initiation is instantaneous and the polymerization is conducted at about 10° C. to 80° C., preferably at 25° to 60° C. with agitation at a pressure of atmospheric to 15 psig and higher, preferably 5 psig. The reaction is complete in about 0.2 to 1.5 hours, completion being indicated by total solids content. Total solids content is indicative of the degree of conversion and the reaction is deemed to be complete when all of the monomer is converted, as indicated by the weight of polymer obtained. The reaction product is a dispersion of discrete polymer particles suspended in a diluent. The particle size is generally on the order of about 0.1 millimeter, more specifically, about 0.3×0.2 millimeter compared to about 1×3 millimeter for conventional slurry polymerization product prepared in absence of a dispersant. In a preferred embodiment, the dispersion is stable and the particles remain in suspension after stopping agitation. The dispersion is refined and dried to a free-flowing particulate product.

The sequence of steps described above should be followed in order to obtain the desired results. For instance, dispersant must be in the polymerization system prior to addition of the monomer charge since. Since initiation of the reaction is instantaneous upon addition of the catalysts, as was already described, it follows reason that the catalysts, especially the molybdenum or tungsten compound catalyst, should be added last.

In order to illustrate the invention disclosed herein, the following examples are presented that demonstrate different materials and different reaction conditions used in preparing polymeric cycloolefins by the dispersion polymerization technique.

EXAMPLE 1

This experiment demonstrates the use of a polymer of ethylene, propylene, and dicyclopentadiene, hereinafter referred to as EPDM, in the respective monomer weight ratio of 61/33.5/5.5, as a dispersant in the dispersion polymerization of dicyclopentadiene (DCPD), methylnorbornene (MNB), and methyltetracyclododecene (MTD) in the monomer weight ratio of 50/25/25.

The ingredients used in the dispersion polymerization system were as follows:

|  | Volume Basis | Weight Basis |
| --- | --- | --- |
| Pentane | 5000 ml | 3.1 kg |
| DCPD, MNB & MTD Monomers | 481.6 ml | 461.4 g |
| Pentene-1 | 300 ml | 192 g |
| Toluene | 100 ml | 86 g |
| EASC Solution | 4.34 ml | 3.19 g |
| MoCl3 Solution | 4.37 ml | 4.11 g |
| EPDM Dispersant | — | 46 g |

The EASC solution was ethylaluminum sesquichloride cocatalyst, $(C_2H_5)_3Al_2Cl_3$, dissolved in hexane at a concentration of 24.8% and the MoCl5 solution was molybdenum pentachloride dissolved in ethyl acetate at a concentration of 5%.

The EPDM dispersant was dissolved in a portion of the pentane and toluene mixture and held separately. Pursuant to the dispersion polymerization procedure, the ingredients listed above were added to a stainless steel stirred tank reactor in the following order, with agitation in progress: pentane, the EPDM dispersant solution, monomers with the alkylaluminum halide cocatalyst solution, pentene-1 molecular weight modifier, and lastly, the molybdenum halide catalyst solution. The polymerization reaction commenced immediately after addition of the catalyst as evidenced by the temperature rise. The reaction was initiated at about 25° C. at atmospheric pressure, and was completed in about one-half hour. The reaction was conducted adiabatically, i.e., without adding or removing heat, with temperature rising due to the exothermic reactions from about 25° C. to about 55° C. The final temperature was about 55° C. The reaction product comprised polymer particles suspended in the diluent that remained in suspension after agitation was stopped. The particle size was very much smaller than the polymer particles obtained by slurry polymerization in absence of a dispersant.

The polymer dispersion was mixed with about 2500 ml of Fotocol, a 90% ethanol mixture with about 10% impurities, in a glass flask and filtered through filter paper using an excess amount of Fotocol. The filtered polymer was reslurried in about 2500 ml Fotocol that contained 3 parts by weight of CAO-5 hindered phenol antioxidant, 1 part of methyl zimate thermal stabilizer, and 1 part of Goodrite 3125 antioxidant, based on 100 parts by weight of the polymer. Following agitation, the Fotocol was evaporated and then the polymer was dried in a vacuum oven under high vacuum for 4 hours at 40° C. The product was granular and free-flowing, with an average particle size of about 0.05 millimeter.

Other DCPD/MNB/MTD terpolymers at 50/25/25 weight ratio were prepared by dispersion polymerization technique, as described above, using different dispersants and at different levels. Results of these experiments are tabulated in Table I, below, where ratio of the monomers in the dispersant is in parts by weight:

TABLE I

| Dispersant Composition | Mol. Wt. of Dispersant | Parts of Dispersant Per 100 Parts Monomers | Product Type And Max. Particle Size |
| --- | --- | --- | --- |
| Ethylene/Propylene/DCPD (61/33.5/5.5) | 190,000 | 10 | Stable Latex <<0.1 mm |
| Ethylene/Propylene/DCPD (61/33.5/5.5) | " | 5 | Stable Suspension 0.1–0.2 mm |
| Styrene/Butadiene Diblock (25/75) | 83,000 | 10 | Stable Suspension 0.1–0.2 mm |
| Styrene/Butadiene Diblock (25/75) | " | 5 | Less stable Suspension 0.2–0.5 mm |
| Styrene/Butadiene Diblock (48/52) | 85,000 | 5 | Less stable Suspension 0.2–0.5 mm |
| Styrene/Butadiene Random Block (23/77) | 300,000 | 7.5 | Less stable Suspension <<0.1 mm |
| Cis-Polybutadiene | 140,000 | 5 | <<0.1 mm |
| Ethylene/Propylene (55.5/45.5) | 130,000 | 10 | Slurry and Paste (no dispersion) 0.1–2 mm |
| Polystyrene | Unknown |  | Slurry (no dispersion) |

TABLE I-continued

| Dispersant Composition | Mol. Wt. of Dispersant | Parts of Dispersant Per 100 Parts Monomers | Product Type And Max. Particle Size |
|---|---|---|---|
| | | 7.5 | about 2 mm |

In the above table, stable latex defines a latex containing superfine polymer particles which do not precipitate or settle out over an extended period of time of about one-half year; stable suspension is characterized by the presence of polymer particles that precipitate or settle out over a 12-hour period after stopping agitation; and less stable suspension is characterized by polymer particles that begin to precipitate upon stopping agitation and settle out over a one-hour period. These particles do not tend to agglomerate whereas in case of a slurry polymer, the particles settle out almost immediately after stopping agitation and the particles tend to agglomerate. The particle size given in Table I, above, is the maximum particle size, with an average particle size being roughly about one-half of the maximum.

The monomers that were polymerized in the presence of the above-identified dispersants at 5 to 10 parts per 100 parts of the monomers, produced polymer particles of this invention that were much smaller than the slurry products produced without any dispersant and the particles remained dispersed over a period of time, although in some instances, the particles settled out in a period of about one hour. A general trend was observed in that the dispersion became more stable and the particle size became smaller as the rubber or the dispersant concentration increased. The most stable dispersion was obtained with the ethylene/propylene/dicyclopentadiene or EPDM dispersant. At 10 parts of the EPDM dispersant, the dispersion was extremely stable, with the particles remaining in suspension for over one-half year. At 5 parts of the EPDM dispersant, however, the dispersion was less stable and some particles settled out slowly over a 12-hour period in absence or agitation, although some fine particles remained suspended for months.

The polystyrene-polybutadiene (25/75) diblock copolymer, at 10 parts level, also gave a reasonably good dispersion in that only a minor fraction of the particles settled out over a 12-hour period. The polystyrene-polybutadiene (48/52) diblock copolymer, however, did not give as stable a dispersion as the 25/75 polystyrene-polybutadiene diblock copolymer. At 10 parts and at 5 parts level of the 48/52 SB copolymer, the dispersions were less stable and the bulk of the particles began to settle out upon stopping agitation.

The polystyrene-polybutadiene random block copolymer and cis-polybutadiene did not give stable dispersion although these dispersants also produced fine polymer particles and a suspension of some super fine particles that lasted over a period of one week.

In addition to yielding dispersions of polymer particles, the EPDM and polystyrene-polybutadiene random block dispersants also caused a substantial reduction in the build-up of polymer on the interior of the stainless steel reactor, and results were similar with a glass reactor. This property appears to be consonant with the dispersing properties of the dispersants. The build-up of polymer on reactor walls for the dispersion polymerization was much less than for slurry polymerization. In the dispersion polymerization systems, the polymer build-up on reactor walls diminished as the dispersion became more stable. Where stable latex was produced, the polymer build-up was nearly nonexistent and the interior of the reactor was clean.

Of all of the dispersants tested, the EPDM dispersant appears to be the most active in bonding chemically to the cycloolefin terpolymers and in forming steric barriers. In general, the effect of steric barrier in a dispersion system is to lower the interfacial tension thus reducing the energy required for phase separation and also reducing the threshold molecular weight for precipitation. This is believed to be due to the carbon to carbon double bond (C=C) in the pendant 5-carbon ring of dicyclopentadiene in the EPDM dispersant which appears to be more functional than the C=C in the backbone chains in the other dispersants that were tested. This conclusion is supported by the results for the ethylene/propylene copolymer and polystyrene dispersants, both being saturated polymers. These experiments did not result in a dispersion but a slurry containing particles of about 0.5 mm in diameter and the particles were as clearly separated from the diluent as in a slurry system prepared without any dispersant. Therefore, the C=C bonds, especially the ones in the pendant group and less significantly the ones in the backbone chains, appear to be responsible for the presumed coupling reactions which bring about the formation of a dispersion.

EXAMPLE II

This example demonstrates improved impact strength of cycloolefinic terpolymers prepared by dispersion polymerization in the presence and absence of a dispersant.

The terpolymer was dicyclopentadiene/methylnorbornene/methyltetracyclododecene (DCPD/MNB/MTD) at 50/25/25 weight ratio prepared as described in Example 1 in absence and in presence of 10 parts of ethylene/propylene/dicyclopentadiene (EPDM) dispersant having weight ratio of 61/33.5/5.5 per 100 parts of the monomer charge. The terpolymer samples also contained 1 part by weight of CAO-5 antioxidant, 1.5 part of methyl zimate thermal stabilizer, 1 part of zinc oxide costabilizer, and 1.5 part of Goodrite ® 3125 antioxidant, but no other additives. The heat distortion temperature (HDT) was determined by the ASTM D-648 test and the Izod impact resistance at room temperature and at −40° C. was determined pursuant to ASTM D-256 test. The results are given in Table II, below:

TABLE II

| | Polymer | HDT | R.T.Izod ft-lb/in | −40° C. Izod ft-lb/in |
|---|---|---|---|---|
| A. | DCPD/MNB/MTD (50/25/25) Slurry Without Dispersant | 98° C. | 1.2 | 0.8 |
| B. | DCPD/MNB/MTD (50/25/25) Dispersion With 10 parts EPDM Dispersant | 87° C. | 14.3 | 11.8 |

As is shown in the above table, 10 parts of the EPDM dispersant used in the preparation of the terpolymer incredibly increased its room temperature and −40° C. Izod impact strength from 1.2 to 14.3 ft-lbs/in and from 0.8 to 11.8 ft-lbs/in, respectively. Although the EPDM-containing polymer had a lower heat distortion temperature of 87° C. v. 98° C. for the blank slurry polymer, this value is still more than high enough to qualify the polymer for various engineering plastic applications. Plastic applications for the dispersion polymer of this example, and other dispersion polymers disclosed herein, include plastic prototype parts, solar panels, potting compounds for electronic components, and parabolic dishes for microwave receivers.

I claim:

1. Process for polymerizing by ring opening polymerization at least one monomer selected from monomers containing the norbornene group shown below,

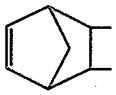

said process comprising reacting said monomer(s) in the presence of a hydrocarbon diluent, a catalyst system, and a sufficient amount of a dispersant to produce a particulate polymer product comprising polymer particles dispersed in said diluent, said polymer particles being of a size that are much smaller than polymer particles prepared in absence of said dispersant, said diluent being a solvent for said monomer(s) but a nonsolvent for said polymer particles, and said dispersant being selected from unsaturated elastomers that are soluble in said diluent and have a double bond along the backbone chain or in a pendant group thereof.

2. Process of claim 1 wherein said dispersant is selected from polymers of a lower aliphatic olefin containing 2 to 10 carbon atoms and a small amount of a cyclic diene that contains a norbornene group and unsaturation outside of said norbornene group and unsaturation in the polymerized state; polymers of a vinyl aromatic compound containing 8 to 12 carbon atoms and an aliphatic diene containing 4 to 12 carbon atoms per molecule; and polymers of at least one monomer selected from aliphatic dienes containing 4 to 12 carbon atoms.

3. Process of claim 2 wherein said aliphatic olefin contains 2 to 4 carbon atoms, said vinyl aromatic compound contains 8 to 10 carbon atoms, and said aliphatic diene is selected from the following dienes:

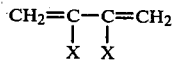

where each X is individually selected from hydrogen, halogens, and alkyl radicals of 1 to 5 carbon atoms.

4. Process of claim 1 wherein said dispersant is selected from polymers of a major amount of ethylene and propylene and a small amount of a cyclic diene containing a norbornene group and unsaturation outside of said norbornene group and unsaturation in the polymerized state; polymers of a vinyl aromatic compound containing 8 to 10 carbon atoms and a diene monomer selected from the following aliphatic dienes;

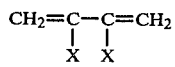

where each X is individually selected from hydrogen, chlorine, and alkyl radicals of 1 to 3 carbon atoms; and polymers of at least one monomer selected from aliphatic dienes defined above; said monomers containing the norbornene group are defined by the following formulas:

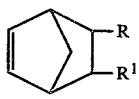 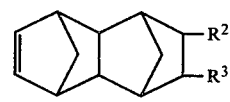

where R and $R^1$ are independently selected from hydrogen, alkyl groups of 1 to 20 carbon atoms, and saturated and unsaturated hydrocarbon cyclic groups formed by R and $R^1$ together with the two ring carbon atom connected thereto containing 4 to 7 carbon atoms; and wherein $R^2$ and $R^3$ are independently selected from hydrogen and alkyl groups selected from hydrogens of 1 to 20 carbon atoms.

5. Process of claim 4 wherein said cyclic diene is selected from dicyclopentadiene and ethylidene norbornene; wherein in said monomers containing the norbornene groups, R and $R^1$ are independently selected from hydrogen, alkyl groups of 1 to 3 carbon atoms, and monounsaturated hydrocarbon cyclic groups containing 5 carbon atoms; wherein $R^2$ and $R^3$ are independently selected from hydrogen and alkyl groups of 1 to 3 carbon atoms; and wherein amount of said dispersant is about 1 to 20 parts per 100 parts of said monomer(s) containing the norbornene group.

6. Process of claim 5 wherein said dispersant is selected from polymers of at least 40 mole percent of ethylene, about 5 to 50 percent propylene, and about 1 to 10 mole percent of dicyclopentadiene; polymers of a major amount butadiene and a lesser amount of styrene; and polymers of butadiene.

7. Process of claim 6 wherein said dispersant is selected from the following polymers: terpolymers of ethylene, propylene and dicyclopentadiene in the respective weight ratio of about 61/33.5/5.5, diblock polymers of styrene and butadiene in the respective weight ratio of about 25/75, diblock polymers of styrene and butadiene in the respective weight ratio of about 48/52, random block polymers of styrene and butadiene in the respective weight ratio of about 23/77, and homopolymers of butadiene.

8. Process of claim 6 wherein said diluent is selected from alkanes containing 4 to 6 carbon atoms, isooctane, and mixtures thereof, and said catalyst system includes an alkylaluminum halide or an aluminum halide with an elemental halide cocatalyst and a molybdenum or a tungsten compound catalyst in a sufficient amount to initiate said reaction, amount of said catalyst is about 0.01 to 50 millimoles per mole of said monomer(s) and the molar ratio of said cocatalyst to said catalyst is in the range of about 200:1 to 1:10.

9. Process of claim 8 wherein said diluent contains up to about 5% by volume of toluene, said reaction is conducted under agitation at a temperature of 10° to 80° C. and a pressure of atmospheric to 15 psig, and said monomers containing the norbornene group are selected from norbornene, methylnorbornene, tetracyclododecene, methyltetracyclododecene, dicyclopentadiene, and tetracyclododecene.

10. Process of claim 7 wherein said diluent is selected from alkanes of 5 to 6 carbon atoms, and isooctane; said monomers containing the norbornene group are selected from methylnorbornene, methyltetracyclododecene, and dicyclopentadiene; amount of said dispersant is 2 to 10 parts per 100 parts of said monomer(s);

amount of said catalyst is 0.1 to 10 millimoles per mole of said monomer(s) and the molar ratio of said cocatalyst to said catalyst is in the range of about 10:1 to 2:1; and said polymer particles dispersed in said diluent do not settle out immediately after agitation is stopped and said polymerization process results in none or very little polymer build-up on inner walls of the reactor where the polymerization reaction is compared to a polymerization reaction in absence or a dispersant.

* * * * *